US010347050B1

(12) United States Patent
Wang et al.

(10) Patent No.: US 10,347,050 B1
(45) Date of Patent: Jul. 9, 2019

(54) AUGMENTED REALITY DEVICE TO WARP IMAGES

(71) Applicant: Apple Inc., Cupertino, CA (US)

(72) Inventors: Paul X. Wang, Cupertino, CA (US); Ray Chang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/713,246

(22) Filed: Sep. 22, 2017

Related U.S. Application Data

(60) Provisional application No. 62/398,435, filed on Sep. 22, 2016.

(51) Int. Cl.
  *G06F 3/01* (2006.01)
  *G02B 27/01* (2006.01)
  *G06T 19/00* (2011.01)

(52) U.S. Cl.
  CPC .......... *G06T 19/006* (2013.01); *G02B 27/017* (2013.01); *G06F 3/011* (2013.01); *G02B 2027/014* (2013.01); *G02B 2027/0138* (2013.01); *G02B 2027/0187* (2013.01)

(58) Field of Classification Search
  None
  See application file for complete search history.

(56) References Cited

U.S. PATENT DOCUMENTS

| | | | |
|---|---|---|---|
| 5,060,062 A | 10/1991 | Dotson | |
| 8,135,227 B2 | 3/2012 | Lewis | |
| 8,412,413 B1* | 4/2013 | Stark | G02B 27/01 340/980 |
| 9,028,067 B1 | 5/2015 | Fleischman | |
| 2014/0168056 A1* | 6/2014 | Swaminathan | G06K 9/00604 345/156 |
| 2016/0026253 A1* | 1/2016 | Bradski | G02B 27/225 345/8 |
| 2016/0088287 A1* | 3/2016 | Sadi | H04N 19/54 348/43 |
| 2016/0198941 A1 | 7/2016 | Aguilar | |

FOREIGN PATENT DOCUMENTS

WO 2015127146 A1 8/2015

OTHER PUBLICATIONS

Eric Kenneth Victorson, "A Head Mounted Digital Image Warping Prosthesis for Age-Related Macular Degeneration", May 2014, The University of Minnesota (Year: 2014).*

* cited by examiner

*Primary Examiner* — YuJang Tswei

(74) *Attorney, Agent, or Firm* — Blank Rome LLP (57) ABSTRACT

Displaying a warped area includes obtaining an image of a real environment, obtaining a portion of a field of view comprising an obstruction, determining a portion of the image of the real environment corresponding to the obstruction, applying a warping function to an area surrounding the portion of the image of the real environment corresponding to the obstruction to obtain a warped area, and displaying the warped area.

15 Claims, 6 Drawing Sheets

AUGMENTED REALITY DEVICE TO WARP IMAGES

BACKGROUND

This disclosure relates generally to the field of digital image processing, and more specifically to the field of warping images in an augmented reality device.

Many types of visual impairment may result in partial loss of sight, or weakened sight. Visual impairments may be the result of any number of health issues, such as diabetes, old age, retina issues, and the like. As an example, some people develop floaters or blind spots in their eye which cause obstructions in a person's visual field. The result is that people often have to compensate for blind spots and other obstructions and impairments by viewing only portions of a scene at a time. Thus, the full field of view is never made available at once.

SUMMARY

In one embodiment, a method for image warping is described. A method for displaying a warped area includes obtaining an image of a real environment, obtaining a portion of a field of view comprising an obstruction, determining a portion of the image of the real environment corresponding to the obstruction, applying a warping function to an area surrounding the portion of the image of the real environment corresponding to the obstruction to obtain a warped area, and displaying the warped area.

In another embodiment, the method may be embodied in computer executable program code and stored in a non-transitory storage device. In yet another embodiment, the method may be implemented in an electronic device having image capture capabilities.

DETAILED DESCRIPTION

This disclosure is directed to systems, methods, and computer readable media for image warping. In general, techniques are disclosed to provide a warped image of a real environment. According to one or more embodiments, providing a warped image may allow a person with partially impaired or occluded vision the ability to see a full field of view by warping the field of view occluded by an abnormality in the eye.

According to one or more embodiments, a camera may capture an image of a view of a real environment. A portion of the view of the real environment may be determined to be occluded to a user. For example, a user may have an optical obstruction, such as a blind spot or a floater that makes a portion of the field of view occluded. As an example, a portion of the real environment may appear blurry, or not appear at all, based on the optical obstruction. A warping function may be applied to the image surrounding the obstructed portion. In one or more embodiments, the warping function may warp the area surrounding the obstruction such that the real environment appears warped around the obstruction. Thus, when the warped area is displayed, the user can view the full field of view regardless of the optical obstruction.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "lens" refers to a lens assembly, which could include multiple lenses. In one or more embodiments, the lens may be moved to various positions to capture images at multiple depths and, as a result, multiple points of focus. Further in one or more embodiments, the lens may refer to any kind of lens, such as a telescopic lens or a wide angle lens. As such, the term lens can mean a single optical element or multiple elements configured into a stack or other arrangement.

For purposes of this disclosure, the term "camera" refers to a single lens assembly along with the sensor element and other circuitry utilized to capture an image. For purposes of this disclosure, two or more cameras may share a single sensor element and other circuitry, but include two different lens assemblies. However, in one or more embodiments, two or more cameras may include separate lens assemblies as well as separate sensor elements and circuitry.

Figure 1:
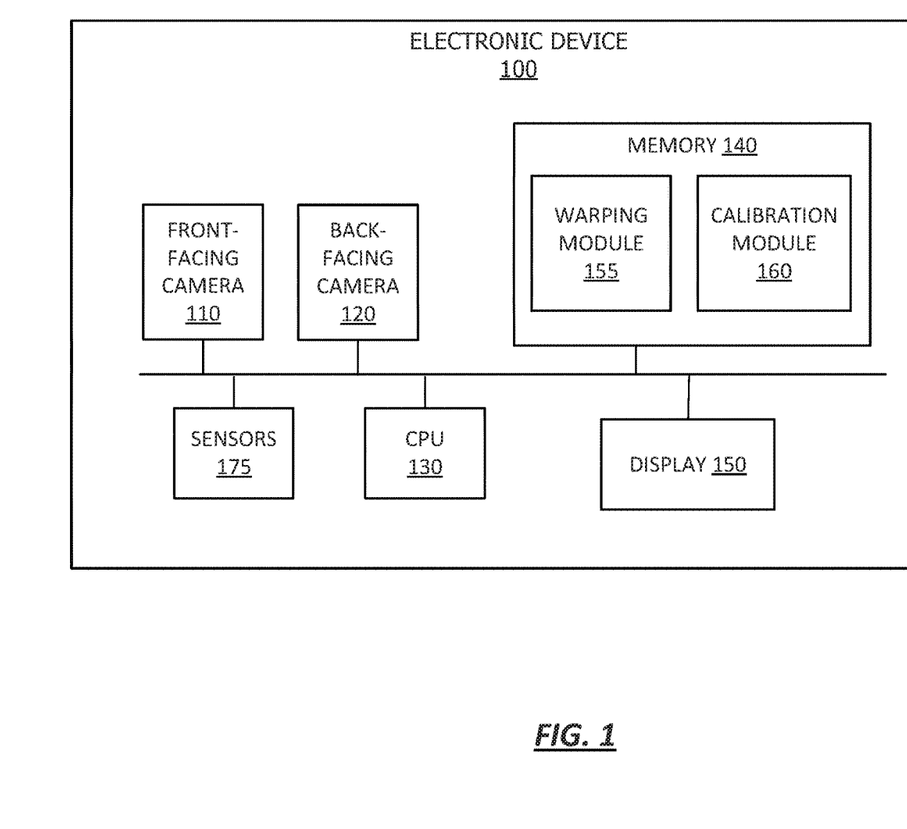
FIG. 1 shows, in block diagram form, a simplified electronic device according to one or more embodiments.

Referring to FIG. 1, a simplified block diagram of an electronic device 100 is depicted, in accordance with one or more embodiments of the disclosure. Electronic device 100 may be part of a multifunctional device, such as a mobile phone, tablet computer, personal digital assistant, portable music/video player, wearable device, or any other electronic device that includes a camera system.

FIG. 1 shows, in block diagram form, an overall view of a system diagram capable of supporting image warping, according to one or more embodiments. Specifically, FIG. 1 depicts an electronic device 100 that is a computer system. Electronic device 100 may be connected to other network devices across a network, such as mobile devices, tablet devices, desktop devices, as well as network storage devices such as servers and the like.

Electronic Device 100 may include a central processing unit (CPU) 130. Processor 130 may be a system-on-chip such as those found in mobile devices and include one or more dedicated graphics processing units (GPUs). Further processor 130 may include multiple processors of the same or different type. Electronic Device 100 may also include a memory 140. Memory 140 may each include one or more different types of memory, which may be used for performing device functions in conjunction with CPU 130. For example, memory 140 may include cache, ROM, and/or RAM. Memory 140 may store various programming modules during execution, including warping module 155 and calibration module 160.

Electronic device 100 may also include one or more cameras, such as front-facing camera 110 and back-facing camera 120. Cameras 110 and 120 may each include an image sensor, a lens stack, and other components that may be used to capture images. In one or more embodiments, the cameras may be directed in different directions in the electronic device. For example, front-facing camera 110 may be positioned in or on a first surface of the electronic device 100, while the back-facing camera 120 may be positioned in or on a second surface of the electronic device 100. In one or more embodiments, the first and second surfaces may be opposite surfaces of the electronic device 100. As another example, front-facing camera may be configured to capture images of an environment from the point of view of a user, whereas back-facing camera is configured to capture images of the user. Although two cameras are depicted, as will be described in further detail below, in one or more embodiments, electronic device 100 may include a single camera. In one or more embodiments, the electronic device 100 may also include a display 150. Display 150 may be any kind of display device, such as an LCD display, LED display, OLED display, or the like. In addition, display 150 could be a semi-opaque display, such as a heads up display, a transparent display, or the like. Further, in one or more embodiments, display 150 may include circuitry to provide a retinal projection.

Although electronic device 100 is depicted as comprising the numerous components described above, in one or more embodiments, the various components may be distributed across multiple devices. Further, additional components may be used, some combination of the functionality of any of the components may be combined.

In one or more embodiments, calibration module 160 is configured to determine an optical obstruction of a user. For example, calibration module may be used to perform a check to determine a location of a blind spot, floater, or the like, in a user's eye. Identifying an optical obstruction may be done in any number of ways. For example, the calibration module 160 may display a test image on the display 150 and request and/or receive feedback from a user indicating whether the test image is visible at certain positions. As another example, one or more sensors 175 may be used.

In one or more embodiments, the calibration module 160 may also determine a relationship between the user's eye and the electronic device 100 such that images captured by the front-facing camera 110 appears correctly on the display 150. In one or more embodiments, the tracking module 160 may track the object in part by determining a depth of the object in relation to one or more of the cameras capturing images of the object. That is, calibration module 160 may implement eye tracking and/or gaze detection technology. In one or more embodiments, the pose of a user's eye and the relationship of the eye to the electronic device may be determined using the back-facing camera to capture an image of the user's eye. The camera capturing the image of the user's eye may be a traditional camera, including a lens stack and sensor, or may be a lenseless camera. In one or more embodiments, the calibration module 160 may additionally, or alternatively, utilize other sensor data from sensors 175 capable of tracking movement and position of a user's eye.

According to one or more embodiments, the calibration module 160 may track the location of the optical occlusion over time. The calibration module 160 may track movements or activities by the user to detect when a user is trying to compensate for an optical occlusion that has shifted. For example, the calibration module 160 may use gaze detection to determine where a user is attempting to focus, and monitoring the motion of a user's eye using gaze detection, or a user's head, using a gyroscope or other sensor 175. Over time, the calibration module 160 may determine when and how an optical occlusion has moved. The new location may be provided to the warping module so that the warped image is generated appropriately such that the user is able to view a full environment, with the environment warped around the obstruction.

According to one or more embodiments, warping module 155 may include instructions executable by a processor, such as CPU 130 to provide a warped image of a real environment as captured by front-facing camera 110. In one or more embodiments, the warping module may obtain an image of a real environment, for example, by front-facing camera 110. The warping module 155 may determine a portion of the field of view of the real environment which is obstructed by an optical obstruction, such as a blind spot or a floater in the eye. The warping module may then determine an area surrounding the portion of the image which is occluded. In one or more embodiments, the area may be an area larger than the occluded portion. For example, the area may be determined to be a particular percentage of area larger than the occluded portion. In one or more embodiments, the warping module 155 may apply a warping function to the area. In one or more embodiments, the warping function may warp the area such that the portion of the image of the real environment corresponding to the obstruction is warped around the portion within the area. Thus, the area may become a warped area. The warping module 155 may cause the warped area to be displayed on display 150 such that the real environment is warped around the occluded portion of the environment.

Figure 2:
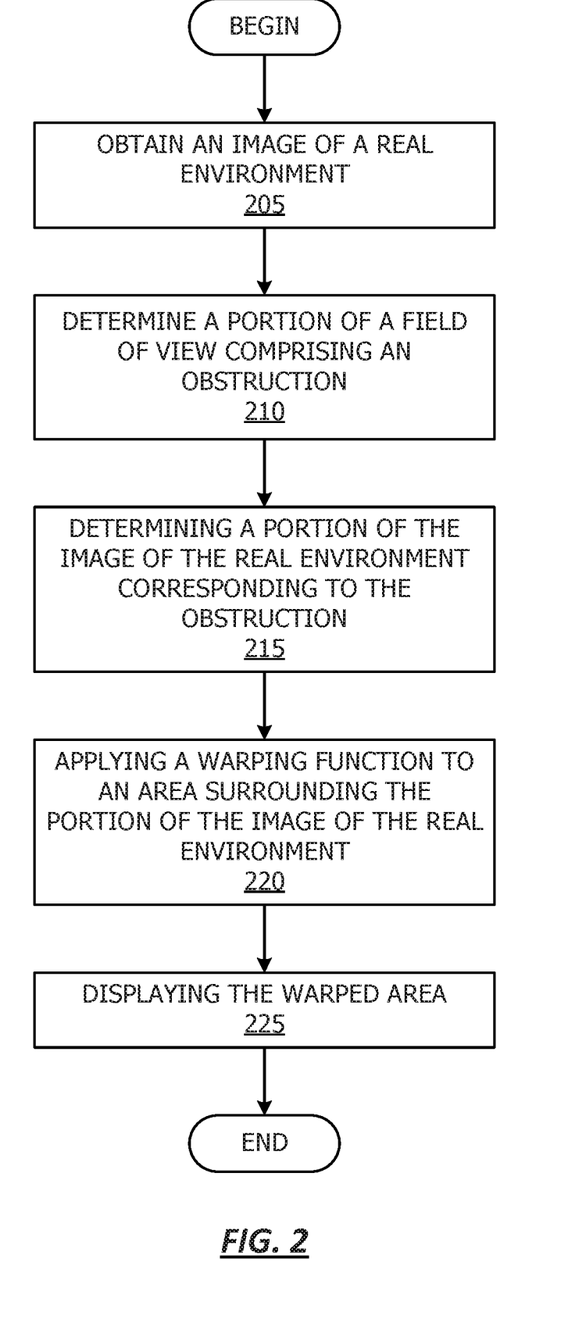
FIG. 2 shows, in flow chart form, an example method for augmenting an image of a real environment, according to one or more embodiments.

FIG. 2 shows, flow chart form, a method for providing a warped display of a real environment. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flow chart begins at 205 where the warping module 155 obtains an image of a real environment. In one or more embodiments, warping module 155 may obtain the image from front-facing camera 110. In one or more embodiments, the warping module 110 may obtain the image from another source, such as an external camera, or a peripheral camera. An image may include a still image, a video stream, a series of frames, a live image, or the like.

The flow chart continues at 210, where the warping module 155 determines a portion of a field of view obstructed by the optical occlusion. In order to determine a portion of the field of view that is obstructed, the warping module 155 may identify a location of the optical occlusion in the eye. That is, the warping module 155 may obtain a location of an abnormality in the eye that is causing a portion of the scene to be obstructed.

In one or more embodiments, the warping module may obtain the location of the optical occlusion from the calibration module 160. In one or more embodiments, the calibration module 160 may determine the location of the optical occlusion during a setup activity for the electronic device 100. That is, a user may calibrate the electronic device 100 to their particular vision impairment at setup. In one or more embodiments, the calibration module 160 may continuously, or occasionally, track a user's activities over time to recalibrate the electronic device 100 based on a shift in the optical occlusion. As an example, over time, a floater or a blind spot may shift.

At 215, the warping module 155 determines the portion of the image of the real environment corresponding to the obstruction. In one or more embodiments, determining a portion o the image of the real environment corresponding to the obstruction may require determining a gaze of the eye, and determining a relationship between the eye and the camera capturing the image. In one or more embodiments, once the warping module 155 obtains the location of the optical occlusion in the eye, the location of the eye in relation to the camera, and a gaze of the eye, then the warping module may determine what part of the image is obstructed by the optical occlusion. Determining the portion of the image of the real environment corresponding to the obstruction will be explained in greater detail below with respect to FIG. 3.

The flow chart continues at 220, and the warping module 155 applies a warping function to an area surrounding the obstructed portion of the image of the real environment. In one or more embodiments, the warping module 155 may use a consistent measure for selecting an area around the obstructed portion of the real environment. In one or more embodiments, the size of the area may be dependent based on the size of the optical occlusion. In one or more embodiments, the size of the area may be selected based on a gaze detection of the eye.

In one or more embodiments, the warping function may cause part or all of the obstructed area of the image to be warped around the occlusion within the warping area. In one or more embodiments, the amount of warp may increase closer to the obstruction such that a user is not distracted by a border surrounding the area. In one or more embodiments, At 225, the warping module 155 may cause the warped area to be displayed. In one or more embodiments, displaying the warped area may include augmenting the image of the real environment to include the warped area and displaying he modified image of the real environment. For example, if the display device is an LCD or LED screen or the like, the full view of the real environment as captured by the camera may be displayed, with the exception that the area surrounding the obstructed portion is modified to include the warped area. In one or more embodiments, the obstructed area may also be replaced.

In one or more embodiments, displaying the warped area may include displaying the warped area on a transparent or semi-transparent display. For example, the warped area may be projected to overlay the area of the real environment corresponding to the obstruction. As an example, if the display is a heads-up display, only the warped area may need to be generated, and displayed on a portion of the display device that corresponds to the obstructed area and the area surrounding the obstructed area. Thus, a user may be viewing the environment through a transparent or semi-transparent display, with an overlay over the area surrounding the obstruction that allows the user to view part or all of the obstructed content.

In one or more embodiments, displaying the warped area may include projecting the warped area using a retinal projection device. That is, the warped area may be projected into the eye such that the warped area surrounding the obstruction is projected directly on the retina. Thus, a user may view a real environment, including areas that would normally be obstructed by the optical occlusion.

Figure 3:
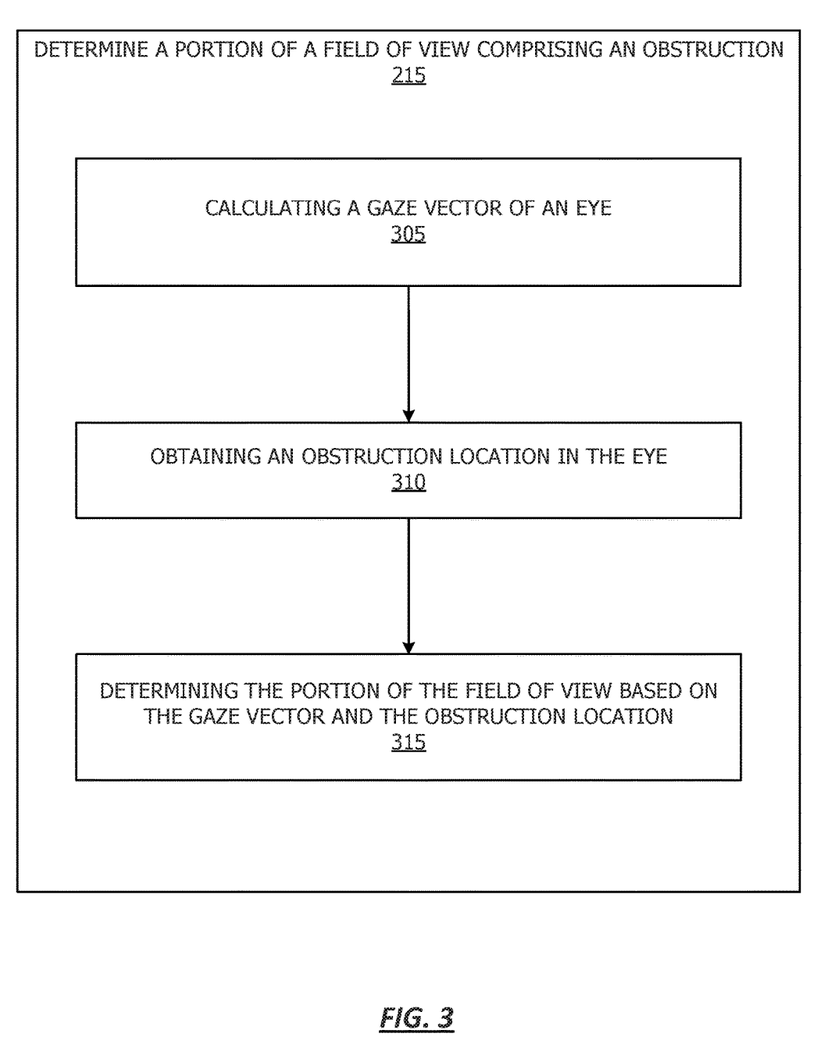
FIG. 3 shows, flow chart form, method for determining a location of an obstruction in a real environment in accordance with one or more embodiments.

Referring now to FIG. 3, a flow chart showing a method of for determining a portion of a field of view comprising an obstruction is shown, according to one or more embodiments. In one or more embodiments, the various actions take place as part of determining a portion of a field of view comprising an obstruction 215. However, the various actions may take place in other locations within FIG. 2. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flow chart begins at 305 and the calibration module 160 calibrates a gaze vector of the eye. In one or more embodiments, the gaze vector indicates where the eye is looking. Thus, the gaze vector may be used to identify a point of focus of the eye. The gaze vector may be determined in any number of ways.

At 310, the calibration module 160 obtains a location of the optical occlusion in the eye. In one or more embodiments, the location of the optical occlusions may be determined during a setup of the electronic device 100 by a user. Further, in one or more embodiments, the location of the optical occlusion may be tracked over time such that the calibration module 160 may detect when the optical occlusion has shifted. The optical occlusion may additionally, or alternatively, be imported from an external source. For example, the relation between the optical occlusion and the eye may be determined in a medical setting, and the data may be imported into the electronic device 100 for use by the calibration module 160.

The flow chart continues at 315 and the calibration module 160 may determine the portion of the field of view based on the gaze vector and the obstruction location. Based on a known relationship between the eye and the optical occlusion, a known or calculated relationship between the eye and the camera, and the gaze vector of the eye, the obstructed portion of the image of the real environment may be determined.

Figure 4:
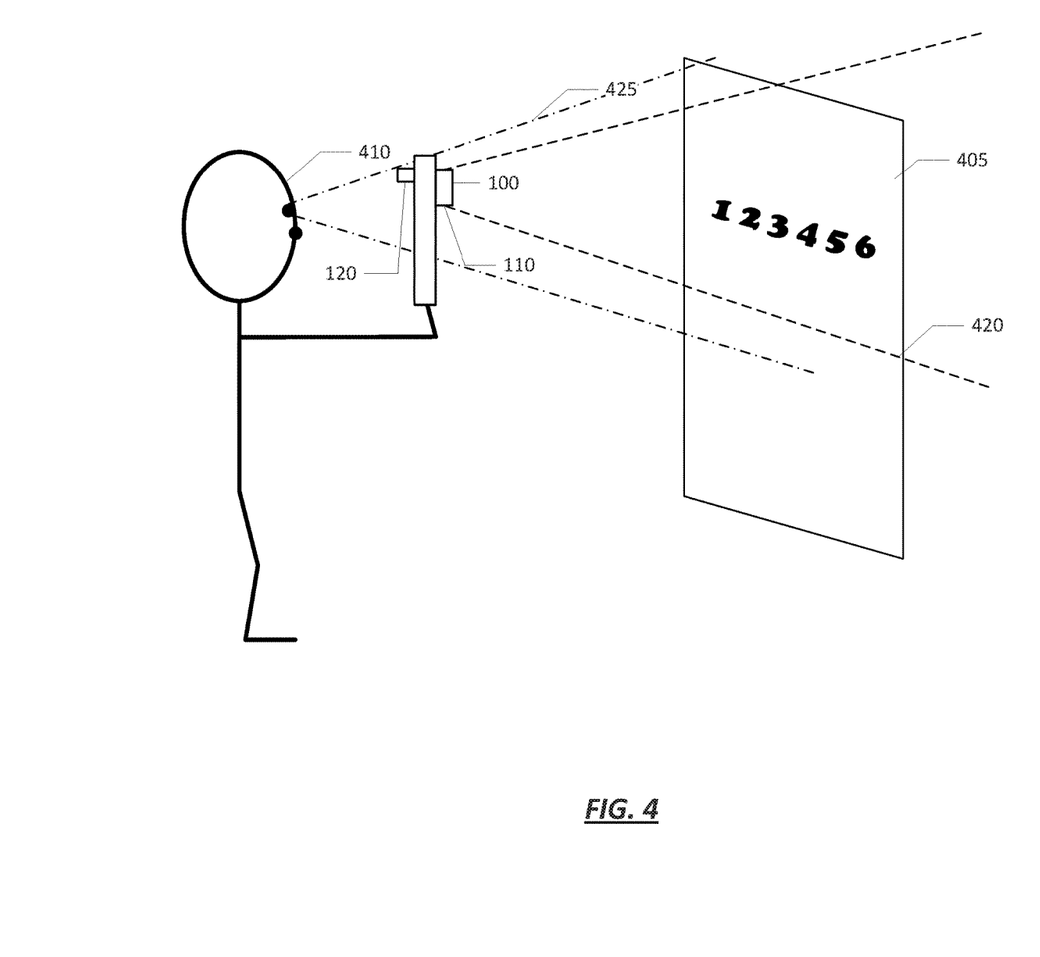
FIG. 4 shows, in system diagram form, an example setup of using a device to warp images of a real world environment, according to one or more embodiments.

Referring now to FIG. 4, a system diagram is shown for an example setup for utilizing a device for presenting a warped image of a real environment, according to one or more embodiments. FIG. 4 shows a user 410 utilizing an electronic device 100 that includes a front-facing camera 110, a back-facing camera 120. In one or more embodiments, the user may view a real environment 405 through the front-facing camera 110 of the electronic device 100. In one or more embodiments, an image of the real environment 405 includes a field of view that is similar to a user's field of view 425 if the user were to look directly at the real environment 405.

Figure 5:
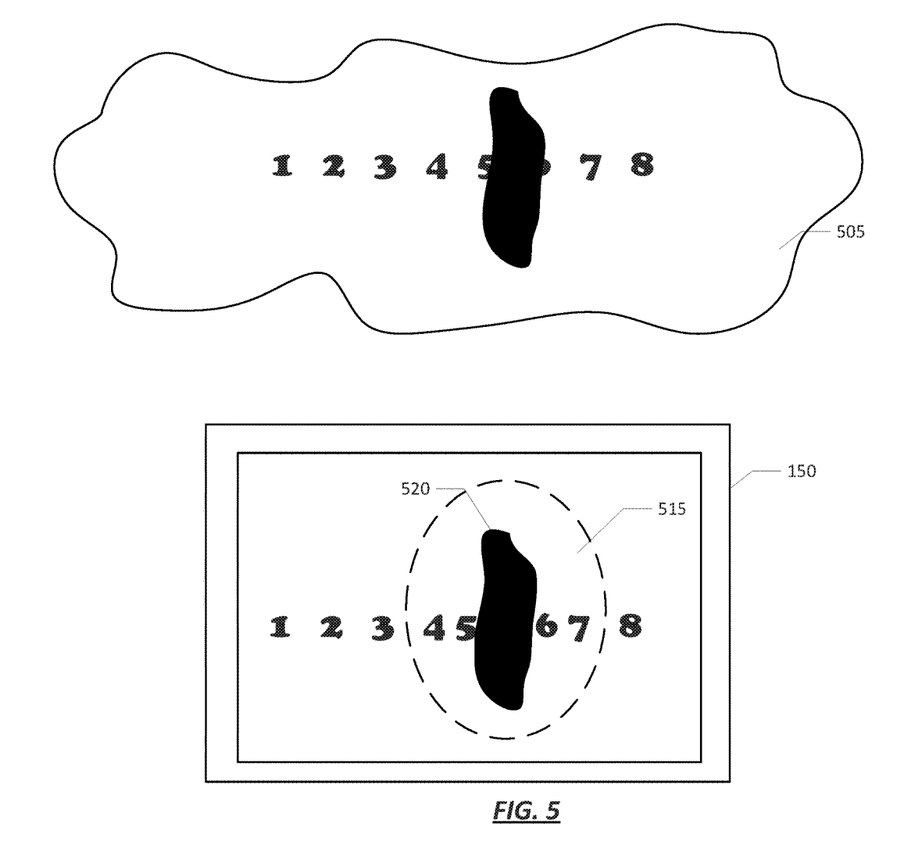
FIG. 5 shows an example system diagram of an augmented reality device to warp images, according to one or more embodiments.

FIG. 5 shows an example system diagram of an augmented reality device to warp images, according to one or more environments. FIG. 5 shows the real world environment as depicted through a display 150 of the electronic device 100. The real world environment as viewed by a user with an optical occlusion is depicted at 505. As shown, part of the image may be obstructed due to the optical occlusion. For purposes of this example, a real world environment may include a series of numerals from one through eight. A user gazing at the real world environment 405 without the use of the electronic device 100 may see an obstruction over the numerals 5 and 6.

As described above, the calibration module 160 may identify a location of an occluded portion 520 of the real world environment. Warping module 155 may generate a warped area 515 surrounding the obstruction. As described above, the warped area is generated such that at least a part of the area within the obstruction 520 is visible within the warped area 515. As depicted, numerals 5 and 6 were not visible to the user without the aide of the electronic device in 505, but become visible when warped in the warped area 515. The remaining portion of the real world environment may remain unchanged in order to be less distractive to the user.

Figure 6:
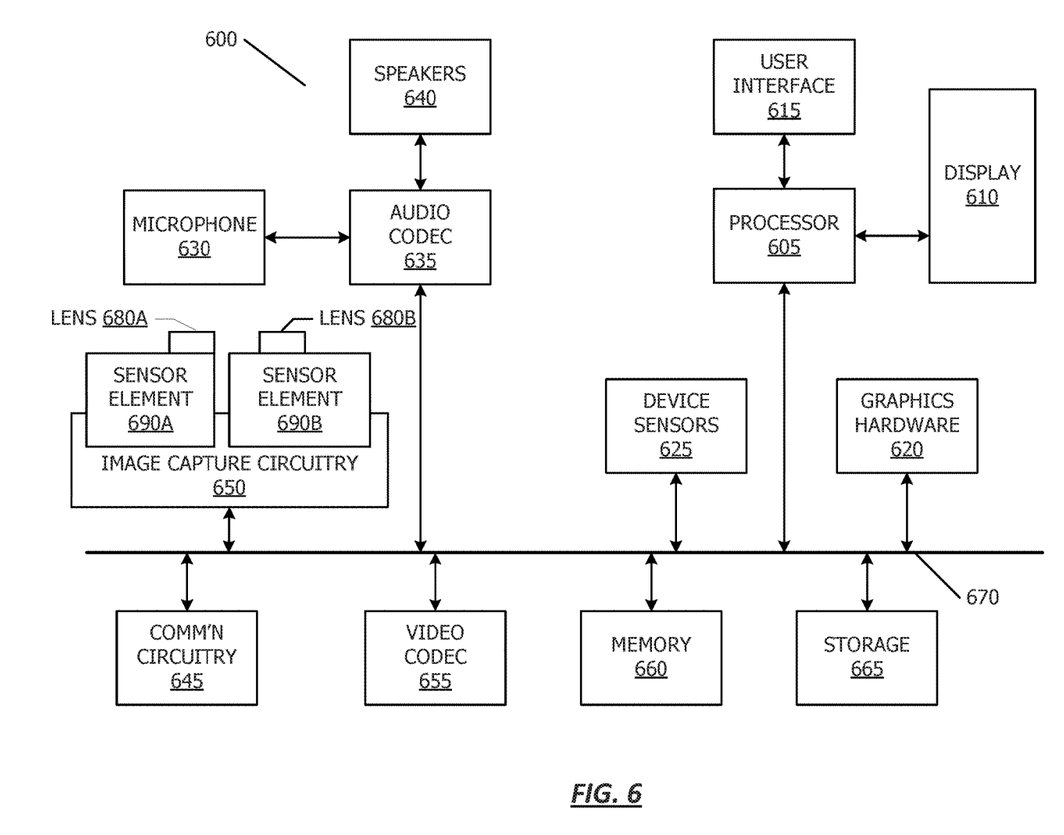
FIG. 6 shows, in block diagram form, a simplified multifunctional device according to one or more embodiments.

Referring now to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system 100) video codec(s) 655 (e.g., in support of digital image capture unit 650), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images and single and multi-camera calibration as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include two (or more) lens assemblies 680A and 680B, where each lens assembly may have a separate focal length. For example, lens assembly 680A may have a short focal length relative to the focal length of lens assembly 680B. Each lens assembly may have a separate associated sensor element 690. Alternatively, two or more lens assemblies may share a common sensor element. Image capture circuitry 650 may capture still and/or video images. Output from image capture circuitry 650 may be processed, at least in part, by video codec(s) 665 and/or processor 605 and/or graphics hardware 620, and/or a dedicated image processing unit or pipeline incorporated within circuitry 665. Images so captured may be stored in memory 660 and/or storage 655.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for displaying a warped area, comprising:
obtaining an image of a real environment captured by a front facing camera of a device;
determining a portion of a field of view of the real environment for a user comprising an obstruction based on an optical occlusion of an eye of the user;
determining a portion of the image of the real environment corresponding to the obstruction, comprising:
determining a relationship between the eye and a front-facing camera;

determining a relationship between the optical occlusion and the eye; and determining the portion of the field of view comprising the obstruction based on the relationship between the eye and the front-facing camera, the relationship between the optical occlusion and the eye, and a gaze vector of the eye;

applying a warping function to an area of the image surrounding the portion of the image of the real environment corresponding to the obstruction to obtain a warped area; and displaying the warped area, wherein the portion of the field of view comprising the obstruction is presented in the warped area.

2. The method of claim 1, wherein an image of the eye is captured by a back-facing camera of the device, and wherein the image of the eye is utilized in determining the relationship between the eye and the front facing camera.

3. The method of claim 1, wherein displaying the warped area comprises:

modifying the image of the real environment to include the warped area;

wherein displaying the warped area comprises displaying the modified image of the real environment on a display device.

4. The method of claim 1, wherein displaying the warped area comprises displaying the warped area as an overlay over the real environment on a transparent display device.

5. The method of claim 1, wherein displaying the warped area comprises projecting the warped area onto a retina of an eye.

6. A system, comprising:

one or more cameras;

one or more processors; and a memory coupled to the one or more processors and comprising instructions executable by the one or more processors to cause the system to:

obtain an image of a real environment from a front facing camera of the one or more cameras;

determine a relationship between the eye and the front facing camera;

determine a relationship between the optical occlusion and the eye;

determine a portion of a field of view for a user comprising an obstruction based on the relationship between the eye and the front-facing camera, the relationship between the optical occlusion and the eye, and a gaze vector of the eye;

determine a portion of the image of the real environment corresponding to the obstruction;

applying a warping function to an area of the image surrounding the portion of the image of the real environment corresponding to the obstruction to obtain a warped area; and displaying the warped area, wherein the portion of the field of view comprising the obstruction is presented in the warped area.

7. The system of claim 6, wherein the image of the eye is captured by a back-facing camera of the one of more cameras, and wherein the image of the eye is utilized in determining the relationship between the eye and the front facing camera.

8. The system of claim 6, wherein the instructions to display the warped area comprise instructions to:

modify the image of the real environment to include the warped area, wherein the instructions to display the warped area comprise instructions to display the modified image of the real environment on a display device.

9. The system of claim 6, wherein the instructions to display the warped area comprise instructions to display the warped area as an overlay over the real environment on a transparent display device.

10. The system of claim 6, wherein the instructions to display the warped area comprises instructions to project the warped area onto a retina of an eye.

11. A non-transitory machine readable medium comprising instructions executable by one or more processors to:

obtain an image of a real environment captured by a front facing camera of a device;

determine a relationship between the eye and the front facing camera;

determine a relationship between the optical occlusion and the eye;

determine a portion of a field of view for a user comprising an obstruction based on the relationship between the eye and the front-facing camera, the relationship between the optical occlusion and the eye, and a gaze vector of the eye;

determine a portion of the image of the real environment corresponding to the obstruction;

apply a warping function to an area of the image surrounding the portion of the image of the real environment corresponding to the obstruction to obtain a warped area; and display the warped area, wherein the portion of the field of view comprising the obstruction is presented in the warped area.

12. The non-transitory machine readable medium of claim 11, wherein an image of the eye is captured by a back-facing camera of the device, and wherein the image of the eye is utilized in determining the relationship between the eye and the front facing camera.

13. The non-transitory machine readable medium of claim 11, wherein the instructions to display the warped area comprise instructions to:

modify the image of the real environment to include the warped area, wherein the instructions to display the warped area comprise instructions to display the modified image of the real environment on a display device.

14. The non-transitory machine readable medium of claim 11, wherein the instructions to display the warped area comprise instructions to display the warped area as an overlay over the real environment on a transparent display device.

15. The non-transitory machine readable medium of claim 11, wherein the instructions to display the warped area comprises instructions to project the warped area onto a retina of an eye.

* * * * *